United States Patent [19]

Ohsawa et al.

[11] Patent Number: 5,991,450

[45] Date of Patent: Nov. 23, 1999

[54] IMAGE ENCODING AND DECODING APPARATUS

[75] Inventors: Hidefumi Ohsawa, Kawaguchi; Yasuji Hirabayashi; Katsutoshi Ushida, both of Kawasaki, all of Japan

[73] Assignee: Canon Kabushiki Kaisha, Tokyo, Japan

[21] Appl. No.: 08/708,628

[22] Filed: Sep. 5, 1996

[30] Foreign Application Priority Data

Sep. 6, 1995 [JP] Japan ...................................... 7-228980
Sep. 6, 1995 [JP] Japan ...................................... 7-228981

[51] Int. Cl.$^6$ ............................ G06K 9/36; H04N 1/419; H04N 1/417; H04N 1/415

[52] U.S. Cl. ........................... 382/245; 382/245; 382/238; 382/250; 382/297; 358/261.1; 358/261.2; 358/261.3; 358/261.4

[58] Field of Search ............................. 358/261.1, 261.2, 358/261.3, 261.4, 539; 382/297, 245, 238, 250

[56] References Cited

U.S. PATENT DOCUMENTS

4,658,430 4/1987 Anderson et al. ....................... 358/261
5,170,264 12/1992 Saito et al. ............................... 358/433
5,710,826 1/1998 Osawa et al. ............................ 382/166

*Primary Examiner*—Edward L. Coles
*Assistant Examiner*—Twyler Lamb
*Attorney, Agent, or Firm*—Fitzpatrick Cella Harper & Scinto

[57] ABSTRACT

At the encoding side, a sum of code lengths of a block is calculated and stored in a memory for each of block lines (stripes); and at the decoding side, when decoding of one block is completed, a head address of a code in the next block is calculated utilizing a sum of an amount of codes utilized for the decoding operation and code lengths for each of the stripes. The rotation process of an image utilizing encoded data is performed in accordance with the head address. Further, at the encoding side, colors of pixels in a predetermined block is determined, and encoding operation is performed block by block for only those blocks including pixels of different colors. At the decoding side, an address of block data for sequentially constructing a rotated image is controlled to decode the pixels in the block, and finally the rotation process is performed on the pixels in the block in accordance with the color of the pixels.

30 Claims, 11 Drawing Sheets

FIG. 4

| A | B | C | D |
| E | F | G | H |
| I | J | K | L |

FIG. 5

| I | E | A |
| J | F | B |
| K | G | C |
| L | H | D |

FIG. 6

| A | B | C | D |
| E | F | G | H |
| I | J | K | L |

| D | H | L |
|---|---|---|
| C | G | K |
| B | F | J |
| A | E | I |

FIG. 15

| d | c | b | a |
|---|---|---|---|

| h | g | f | e |
|---|---|---|---|

| l | h | j | i |
|---|---|---|---|

IMAGE ENCODING AND DECODING
APPARATUS

BACKGROUND OF THE INVENTION

Present invention relates to an image encoding and decoding apparatus for encoding and decoding an inputted image and performing a rotation process on the inputted image.

Conventionally, a method where an image is encoded in a raster unit is often utilized for encoding a black or white binary image. For instance, the MH, MR and MMR methods which are utilized as encoding methods in a facsimile apparatus perform encoding operation depending upon a length of continuous black pixels or white pixels (run length). In an image communication apparatus adopting such encoding method, when an image is to be rotated in 90-degree unit, rotation operation must be performed after an encoded image is decoded to an original image, or before the encoding process is performed.

When encoding is performed by the conventional encoding apparatus, an original document is placed widthwisely (scanning direction is lengthwise) and an image on the original document is read pixel by pixel in the scanning direction.

In the conventional apparatus, the image is sequentially stored in a page memory in accordance with the scanning direction of the original document. Reading operation for encoding a rotated image is performed in a scanning direction different from the direction of the aforementioned storing operation.

In the conventional apparatus, an encoder used for storing image data and a memory, serve as a buffer memory for e.g. performing transmission of facsimile data stored in a memory, or for communicating between facsimile apparatuses each having a different protocol. During communication, encoded data for storage is read from the memory, encoded by the encoder used for storing image data, modulated for transmission by an encoder used for transmission and transmitted. Meanwhile, the transmitted data is decoded by a decoder used for transmission at a receiver's side and printed out on a lengthwisely-placed paper (on which scanning is performed widthwisely).

Conventionally, in order to rotate the scanned image by 90 degrees and encode the rotated image in a raster sequence, it is necessary to temporarily store the entire image in a page memory for rotation, and change the sequence of reading, thereby encoding the image.

Moreover, as an encoding method without requiring a rotation memory, a method is suggested where an image is encoded in a small block unit. However, even if encoding is performed in a small block unit based on run length, each of the run length is short in such encoding method; therefore, compression rate of an image is not improved. The encoding method of encoding an image in a block unit includes a fixed-length encoding method and a variable-length encoding method. In case of encoding by the fixed-length encoding method, a block-unit code can be randomly accessed, however, when comparing it with encoding by the variable-length encoding method for obtaining the same compression rate, image deterioration is significant.

On the other hand, in case of the variable-length encoding method, image deterioration is not so noticeable; but in order to access codes by changing sequences of blocks, head addresses of the block codes must be stored separately. The amount of data for storing the addresses is calculated by a number of blocks×a number of bits (16 to 32 bit) required for addressing/8 [bytes]. This raises a problem that the amount of data grows to an undesirable size when the image size becomes large.

Figure 20:
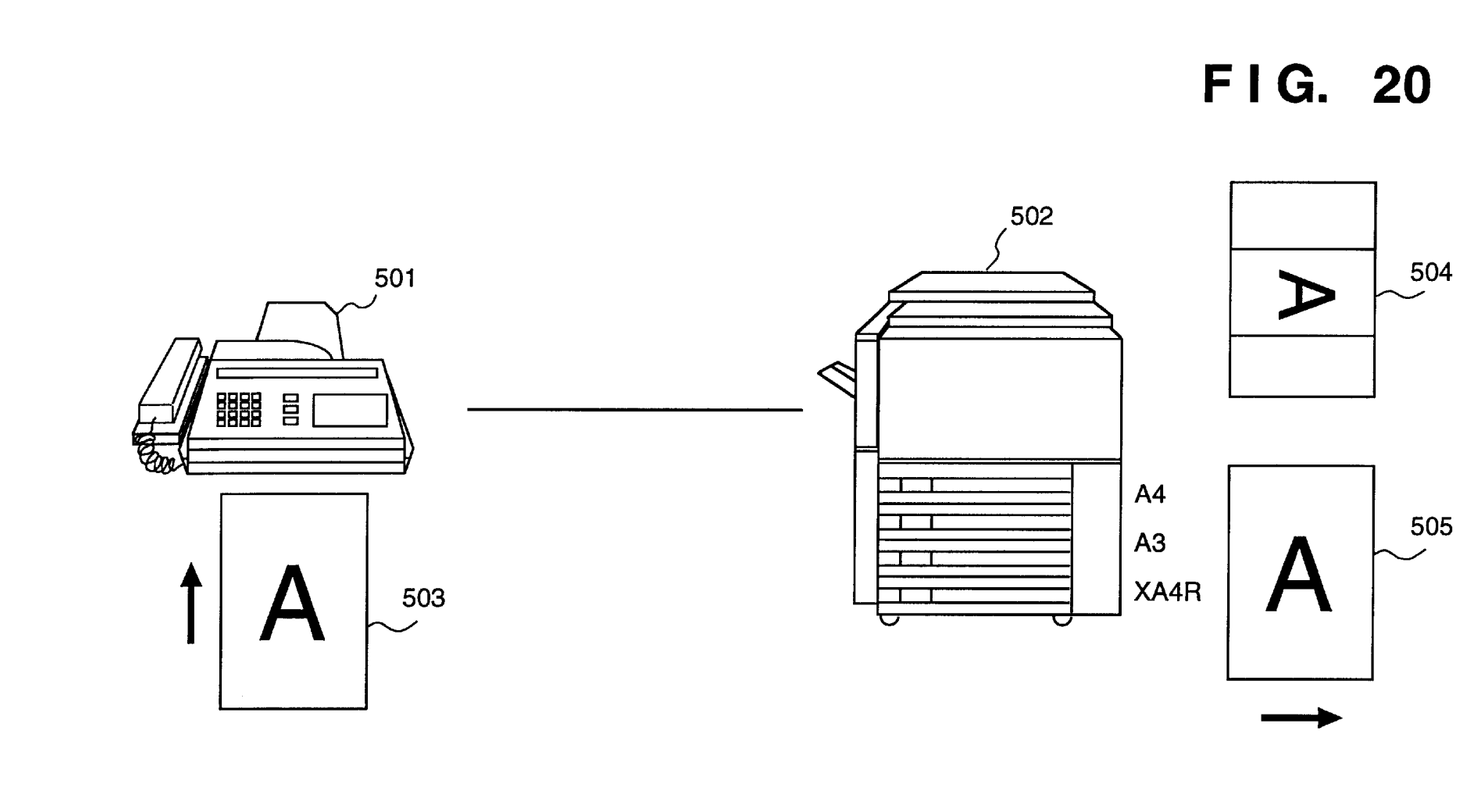
FIG. 20 is a view showing an operation of a conventional facsimile apparatus.

FIG. 20 shows an operation executed by a conventional facsimile apparatus. Standardization for the conventional facsimile apparatus (501), specifies only a lengthwise feeding of an original document or a recording sheet (503 in FIG. 20) having the size of either A4 or B4. Therefore, in the case where a received image having the size of A4 is to be printed out by a facsimile apparatus (502) capable of printing data on a print sheet of A3 size (i.e. the facsimile having a printer capable of feeding a recording sheet of A4 side sideways), the received image must be reduced 70% so that the entire image can be printed on one recording sheet of A4 size which is fed sideways (504 in FIG. 20). Alternatively, received and decoded image data must be written in a page memory and by controlling the memory access, the written image must be rotated 90 degrees to be printed on the sheet (505 in FIG. 20).

SUMMARY OF THE INVENTION

The present invention has been made in consideration of the above situation, and has as its object to provide an image encoding and decoding apparatus which can perform a rotation process of an image utilizing encoded data.

It is another object of the present invention to provide an image encoding and decoding apparatus which enables a rotation process of an image and re-encoding of the rotated image by utilizing only a buffer for storing several lines.

Further, it is another object of the present invention to provide an image encoding and decoding apparatus which can improve compressibility of an image by employing prediction encoding even when the encoding is performed in a block unit.

In order to attain the above objects, the present invention provides an image encoding and decoding apparatus having an encoder for encoding an inputted image and a decoder for decoding the encoded image, for performing a rotation process on said image, wherein said encoder comprises: means for dividing the inputted image into plural blocks; means for obtaining code data of pixels in the plural blocks; means for calculating a sum of code length data of pixels included in a predetermined block unit associated with the plural blocks; and means for storing the code data and the sum of the code length data, and wherein said decoder comprises: means for generating a head address of a block subjected to decoding in accordance with a predetermined sequence corresponding to said rotation process, based on the stored sum of the code length data; means for reading out the stored code data in accordance with the head address; means for decoding the read-out data; and means for performing said rotation process on pixels obtained by said decoding in each of the plural blocks.

Further, in order to attain the above objects, the present invention provides an image encoding and decoding apparatus having an encoder for encoding an inputted image and a decoder for decoding the encoded image, for performing a rotation process on said image, wherein said encoder comprises: means for dividing the inputted image into plural blocks; determination means for determining colors indicated by pixels in the plural blocks; first encode means for encoding the determination result obtained by said determination means; second encode means for obtaining code data of pixels in the plural blocks in accordance with the determination result; and means for storing the data encoded by said first encode means and said second encode means, wherein said decoder comprises: means for generating an address of a block subjected to decoding in accordance with a predetermined sequence corresponding to said rotation process; means for reading out the stored data in accordance with the address; means for decoding the read-out data; and process means for performing said rotation process on pixels in the block subjected to decoding, in accordance with the determination result obtained by said decoding and with the address, and wherein said rotation process is performed on the pixels of said block via a buffer which stores a number of lines less than an image size of said inputted image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
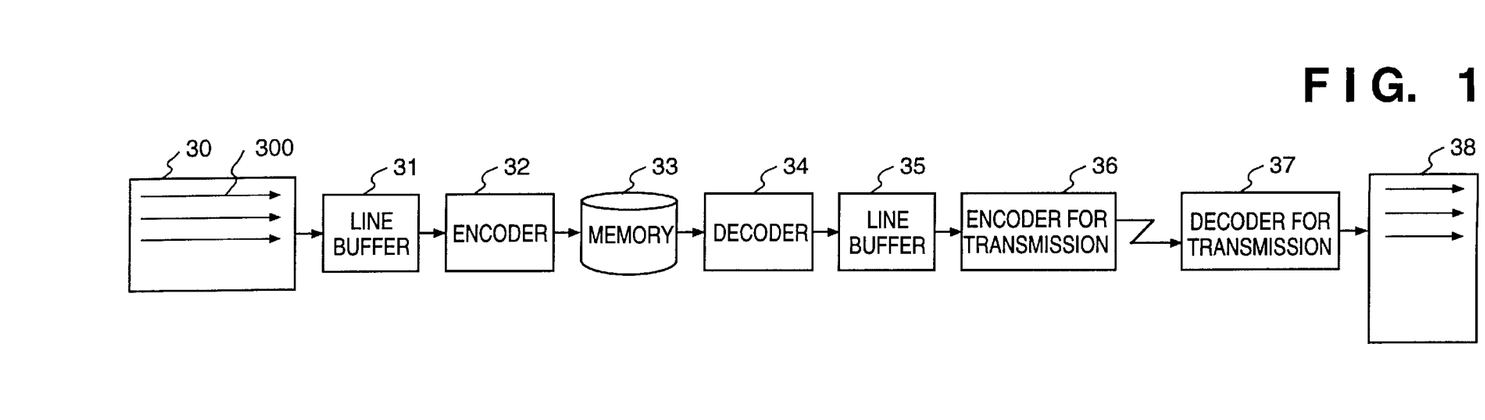
FIG. 1 is a block diagram showing a structure of an encoding and decoding apparatus according to a present embodiment.

FIG. 1 is a block diagram showing a structure of an encoding and decoding apparatus according to the first embodiment. Note that herein, descriptions are given where an image includes black binary data and white binary data.

In FIG. 1, reference numeral 30 denotes an original document which is lengthwisely placed, and an image on the document is read in a pixel unit in a scanning direction 300. Reference numeral 31 denotes a line buffer, having a bit length for a block size which will be described later. Reference numeral 32 denotes an encoder for encoding input data and the data encoded in the encoder 32 is stored in a memory 33.

Reference numeral 34 denotes a decoder, and data decoded in the decoder 34 is written in a line buffer 35. The data is encoded for transmission codes by an encoder 36 for transmission and the encoded data is transmitted. Then the transmitted data is decoded by a decoder on a receiving side, that is, a decoder 37 for transmission, and finally the decoded data is printed on a sheet 38 which is placed lengthwisely.

Figure 2:
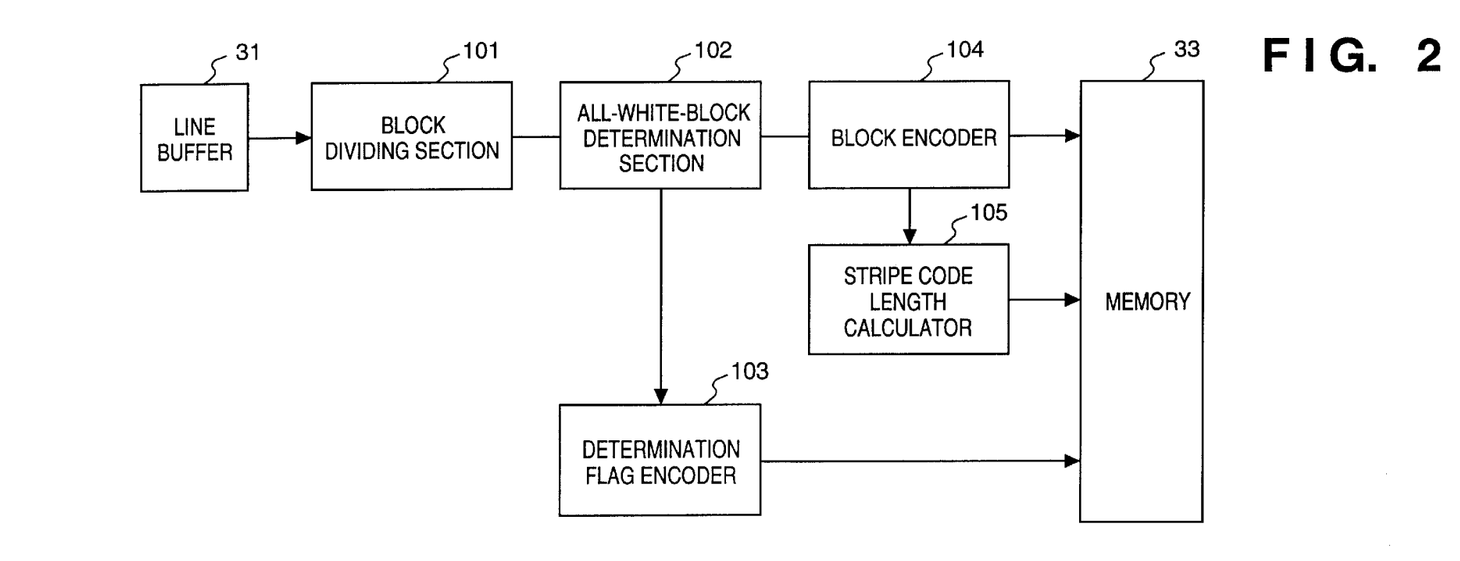
FIG. 2 is a block diagram showing an internal structure of an encoder according to a present embodiment.
Figure 3:
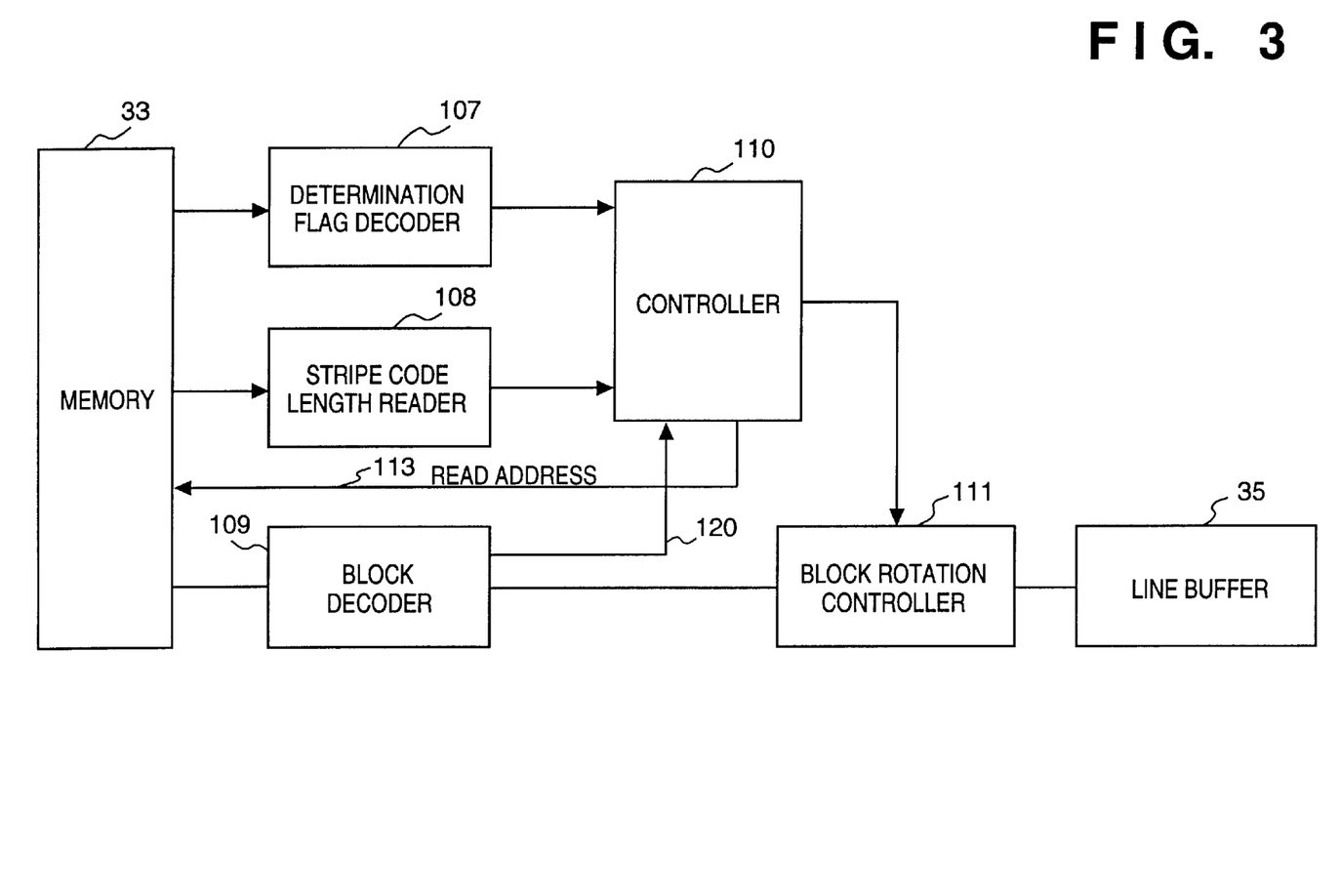
FIG. 3 is a block diagram showing an internal structure of a decoder according to a present embodiment.

FIGS. 2 and 3 are block diagrams showing an internal structure of an encoder and a decoder respectively, according to the first embodiment.

In FIG. 2, reference numeral 31 denotes a line buffer for N lines (in the following example, N=8 or 16); 101, a block dividing section; 102, an all-white-block determination section; 103, a determination flag encoder; 104, a block encoder for encoding pixels in a block; 105, a stripe-code-length calculator; and 33, a code memory. In FIG. 3, reference numeral 107 denotes a determination flag decoder; 108, a stripe-code-length reader; 109, a block decoder for decoding pixels in a block; 110, a controller for controlling an address or the like; 111, a block rotation controller for rotating pixels in a block; 35, a line buffer for N lines; and 113, a read address for reading out a block code.

First, encoding operation is described.

In the line buffer 31 shown in FIG. 2, every N lines of image data (in the following descriptions, N=16 lines) is inputted in the block dividing section 101 to divide the image data into blocks, each of which consisting of 16×16 pixels. In the next stage, the all-white-block determination section 102, a flag is raised if all pixels in a block are white. In this case, the pixels in the block are not subjected to encoding.

In the determination flag encoder 103, the ON/OFF state of the flag, corresponding to an all-white block in the entire image, obtained from the all-white-block determination section 102, is encoded. In the block encoder 104, a pixel value in the block is encoded employing a prediction encoding method. In the stripe-code-length calculator 105, a sum of stripe-code-length data of pixels in the block for each image divided by a unit of 16 lines (in this embodiment, this image is referred to as a stripe image) is calculated. In the memory 33, the encoded data of determination flag obtained by the determination flag encoder 103, the stripe-code-length data obtained by the stripe-code-length calculator 105, and the encoded data of pixels in a block which is encoded by the block encoder 104, are stored altogether as encoded data of one image.

Next, the decoding operation will be described.

In the determination flag decoder 107 shown in FIG. 3, all-white flag (a flag for the all-white block) in a block unit of the entire image is decoded. The stripe-code-length reader 108 reads out code length data of each stripe and the value of the data is set in a stripe counter (not shown) in the controller 110. In the controller 110, block addresses of the blocks to be decoded are calculated in the order taking account of the image rotation process.

First, an all-white flag in a block of interest is inspected. If the flag indicates all white, the rotation process is not necessary. Accordingly, 16×16 block of white data is outputted to the block rotation controller 111 so that the rotation process is not performed. However, if the all-white flag is in the OFF state (if the block is subjected to encoding), the head address of the code in the corresponding block is calculated utilizing the counter value of stripe-code-length data set in the foregoing process. An address signal generated based on the calculated address, that is, the read address 113, is outputted to the memory 33, and the aforementioned encoded data outputted from the memory 33 are sent to the block pixel decoder 109.

In the block decoder 109, the encoded data are decoded, for decoding pixels in the 16×16 blocks, and the decoded data are sent to the block rotation controller 111. In the block rotation controller 111, an image on which the rotation process is performed in the block is sent to the line buffer 35. Further a code length signal 120 utilized for decoding is sent back to the controller 110 from the block encoder 109, and the value in the aforementioned stripe counter is updated by the controller 110 in accordance with the code length signal.

Figure 4:
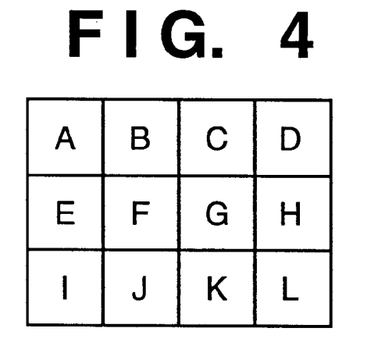
FIGS. 4 and 5 are diagrams explaining a rotation method of an image which is divided into blocks.
Figure 5:
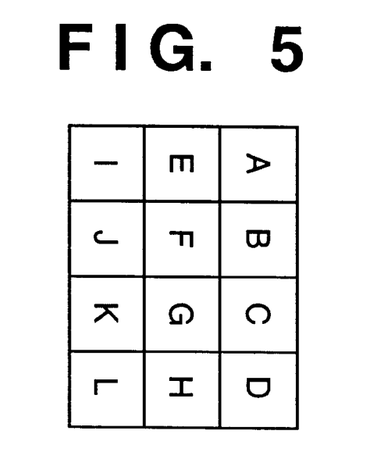

FIGS. 4 and 5 are diagrams for describing a rotation method of an image which is divided into blocks. Herein, as an example, an entire image is divided into 12 blocks, including a block A to a block L.

FIG. 4 shows an arrangement of the blocks before rotation and FIG. 5 shows an arrangement after clockwise rotation. Reading operation of the blocks and the sequence of rotation for forming the rotated image shown in FIGS. 4 and 5 are as follows.

(1) decode block I and rotate
(2) decode block E and rotate
(3) decode block A and rotate
(4) output a block line (I, E, A)
(5) decode block J and rotate
(6) decode block F and rotate
(7) decode block B and rotate
(8) output a block line (J, F, B)
(9) repeat the above operation until a block line (L, H, D) is outputted.

Figure 6:
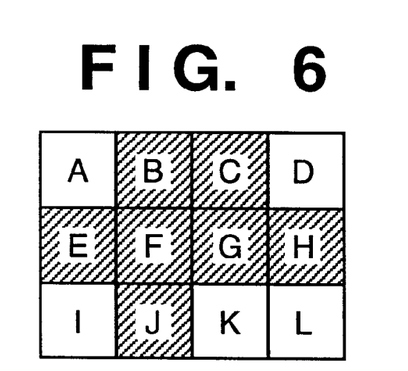
FIG. 6 is a diagram showing a determination result of determining all-white blocks.

FIG. 6 shows a result of determination all-white blocks. In FIG. 6, blocks not hatched indicates all-white block and blocks hatched indicates blocks having a black-pixel value, which are subjected to encoding. Flag data for those blocks is encoded by the determination flag encoder 103. Note that an encoding method used here may be the run length method or prediction encoding method.

Figure 7:
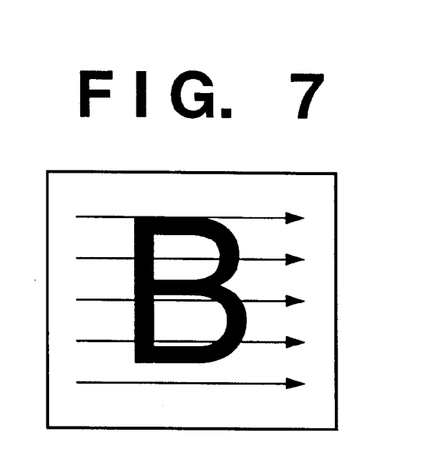
FIG. 7 is an explanatory view showing a scanning direction of pixels in a block.

FIG. 7 is an explanatory view of a scanning direction of pixels in a block. As shown in FIG. 7, pixels in the block are scanned from left to right and from top to bottom, and an encoding process is performed following these scanning sequences of the pixels.

Figure 8:
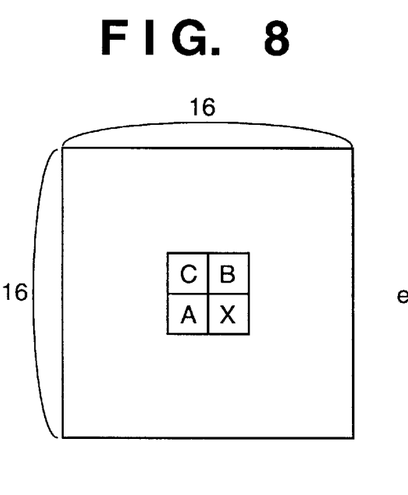
FIG. 8 is a diagram for explaining a prediction referring method of pixels in a block.

FIG. 8 is a diagram for explaining a prediction referring method of pixels in a block. Reference letter X in FIG. 8 denotes a pixel subjected to encoding in the block. With this method, the state whether the pixel X is black or white and a probability of being black/white are calculated from values of three surrounding pixels, pixels A, B and C, and the calculation result is encoded by a prediction encoder which will be described later. Note that it is necessary to determine the state of surrounding pixels in accordance with a predetermined rule for the case where the pixel X is positioned at one of the corners of the block. Normally, the pixel X is assumed to be a white pixel in this case.

Figure 9:
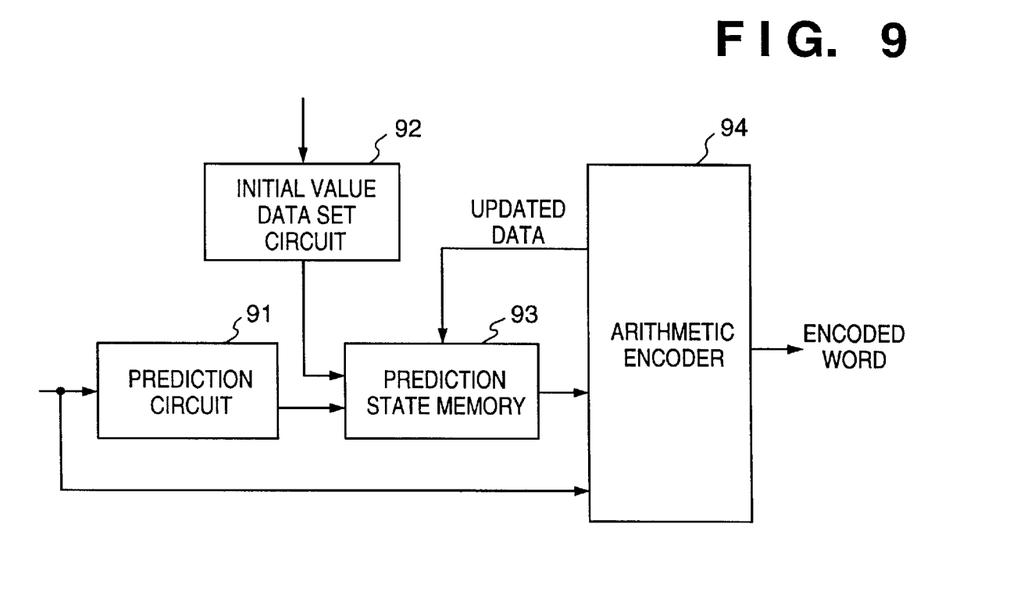
FIG. 9 is a block diagram showing a structure of a prediction encoding circuit according to a present embodiment.

FIG. 9 is a block diagram showing a structure of a prediction encoding circuit in the block encoder 104 according to the present embodiment. In FIG. 9, reference numeral 91 denotes a prediction circuit which serves as a circuit for examining the state of surrounding pixels of the pixel X. Reference numeral 93 denotes a prediction state memory which serves as a circuit for storing data to be given to an arithmetic encoder 94, for each prediction state. Data outputted from the arithmetic encoder 94, which is updated upon completion of encoding one pixel, is stored in the prediction state memory 93 as updated data.

When an initial pixel in a block is encoded, a signal is given from a controller (not shown) to an initial-value data set circuit 92, for returning the value stored in the prediction state memory 93 to an initial value. Note that the arithmetic encoder 94 can be a QM-Coder adopting standardized methods according to JPEG or JBIG, or some other similar methods.

Figure 10:
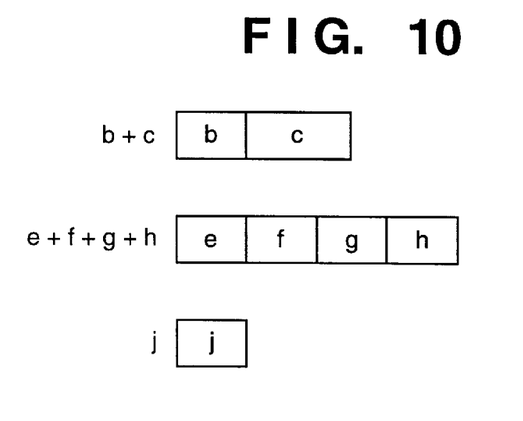
FIG. 10 is an explanatory view showing a calculation method of calculating a head address of a code in a block.

FIG. 10 is an explanatory view showing a calculation method of calculating a head address of encoded codes in the block. Hereinafter, the encoded code in a block will be simply referred to as a block code. In FIG. 10, the reference letters b, c, e, f, g, h and j respectively denote the codes in the blocks B, C, E, F, G, H and J shown in FIG. 6. In the encoder 104, code lengths of (b+c), (e+f+g+h) and (j) are calculated as a code length for each stripe and stored in the memory 33.

In the decoder shown in FIG. 3, the code length for each stripe is read out from the memory 33 and the value associated with the length is set to a counter corresponding to each stripe.

Figure 11A:
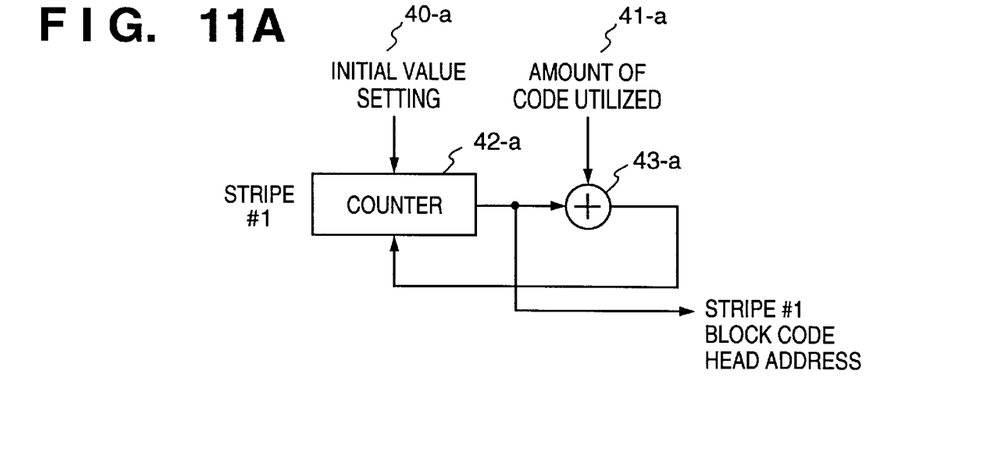
FIGS. 11A, 11B, and 11C are block diagrams showing a circuitry for obtaining a head address of a code in a block by an encoder.
Figure 11B:
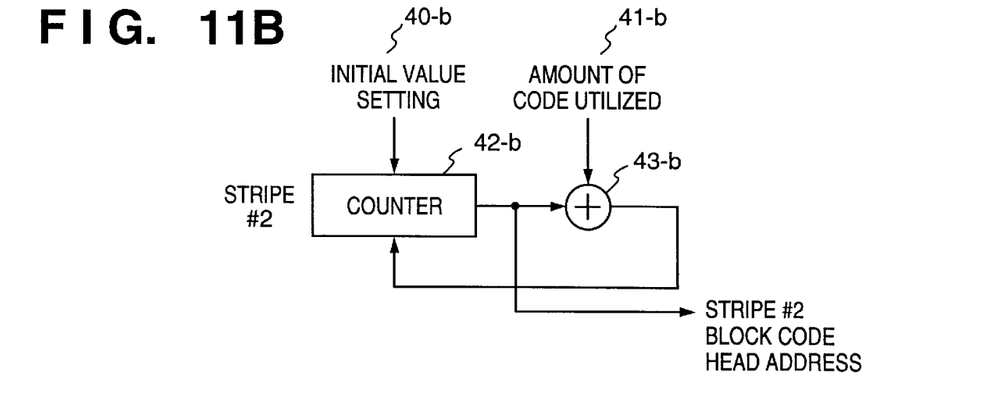
Figure 11C:
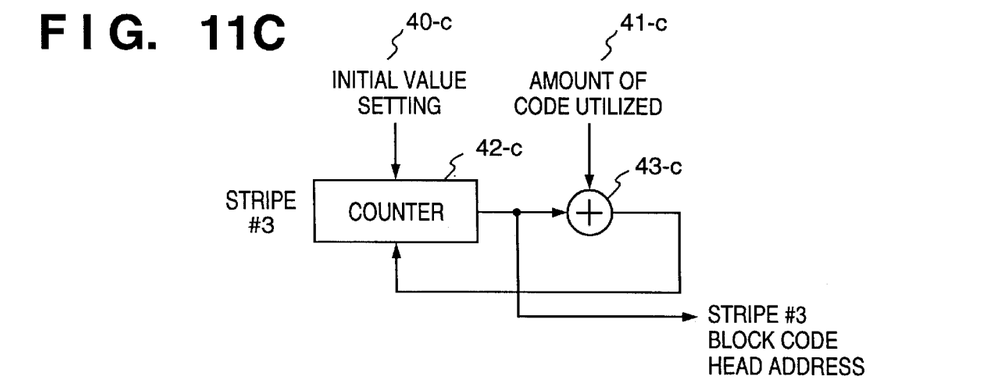

FIGS. 11A, 11B and 11C are block diagrams showing a circuit structure for obtaining a head address of the block code in the decoder. Herein, stripe #1, stripe #2 and stripe #3 are given as an example; however in practice, there are as many circuits as the number of stripes.

In FIG. 11, counter values read from the memory, each of which corresponds to each stripe are set as initial values to initial-value-set signals 40-a, 40-b, and 40-c. In the example shown in FIG. 10, as the counter value for the stripe #1, 0 is set; (b+c) for the stripe #2; and (e+f+g+h) for the stripe #3. Accordingly, a head address of the block code is obtained for each of the blocks A, E and I.

After the decoding process for each block is completed, values (a), (e) and (i) indicative of code lengths 41-a, 41-b and 41-c which are required for decoding the subject block (the amount of codes used for decoding), and values from the counter 42-a, 42-b, and 42-c are added by the adder 43-a, 43-b, and 43-c, and the result of this addition is fed back to the counter. Herein, the value obtained as a result of the addition is set as a head address of a next block.

For instance, by adding a code length (a) utilized to decode the block A to the value from counter #1, a head address of block codes for the block B is obtained. Similarly, by adding the code length (e) utilized to decode the block E to the value from counter #2, a head address of block codes for the block F is obtained; and by adding the code length (i) utilized to decode the block I to the value from the counter #3, a head address of block codes for the block J is obtained.

It should be noted that in the above example, the blocks A and I are all-white blocks and the amount of codes utilized for decoding is zero(0).

Figure 12:
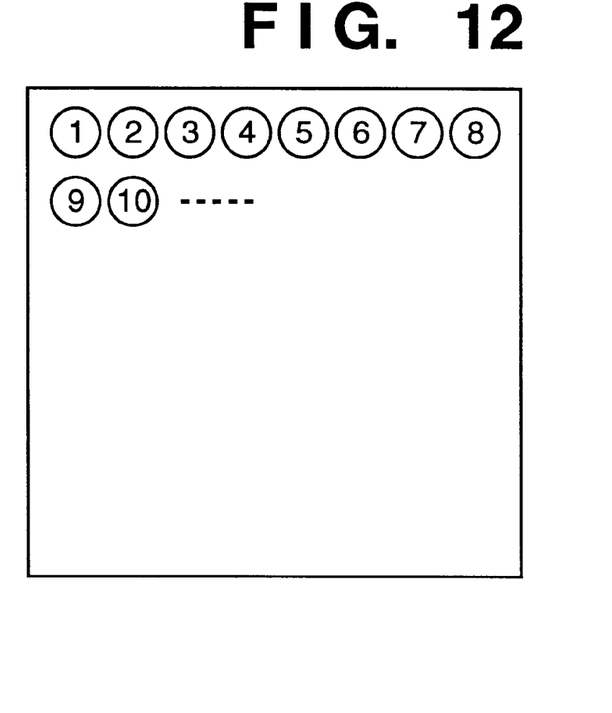
FIGS. 12 and 13 are diagrams for explaining a rotation process of a block.
Figure 13:
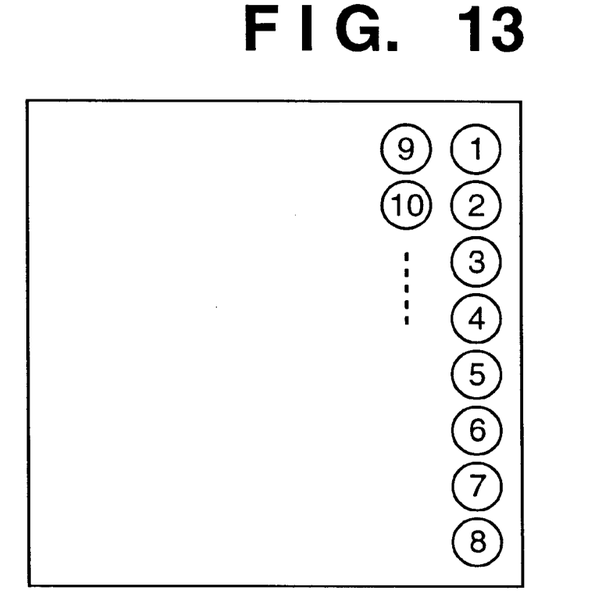

FIGS. 12 and 13 are explanatory views for explaining a rotation process in the block. For brevity, N, a number of lines, is 8 (8×8) in the following example.

Reference numerals 1 to 10 in FIG. 12 denote the sequence of encoding pixels in a block, and reference numerals 1 to 10 in FIG. 13 denote the sequence of writing decoded pixels into a block buffer when 90-degree rotation is performed clockwise. Herein, pixels are written from top to bottom and right to left.

As set forth above, according to the first embodiment, the sum of the block codes is calculated in the encoding process, for each of the block line (stripe) and stored in the memory; while in the decoding process, a code amount utilized for the decoding process is outputted upon completion of decoding one block, and a head address of a block code of the next block is obtained from the sum of the outputted code amount and the code length for each stripe. Accordingly, data amount necessary for obtaining an address is within the following value: a number of stripes × a number of bits (16 to 32 bits) required for addressing/ 8 [bytes]. Therefore, an addressing process and image processing utilizing encoded data become possible.

Further, according to the first embodiment, by utilizing only a buffer for storing several lines and controlling in a block unit, the sequence of reading out encoded compressed-code data, instead of using a memory with a large capacity, it is possible to rotate an image and re-encode the rotated image. Moreover, the compressibility of an image can be improved in the encoding process performed in a block unit by applying the prediction encoding method suitable for encoding an original document which is frequently used.

Note that when an image, which is to be rotated 90 degrees counterclockwise, is generated from encoded data, the sequence of encoding blocks in a stripe must be changed. Hereinafter, a rotation process of performing 90-degree counterclockwise rotation will be briefly described.

Figure 14:
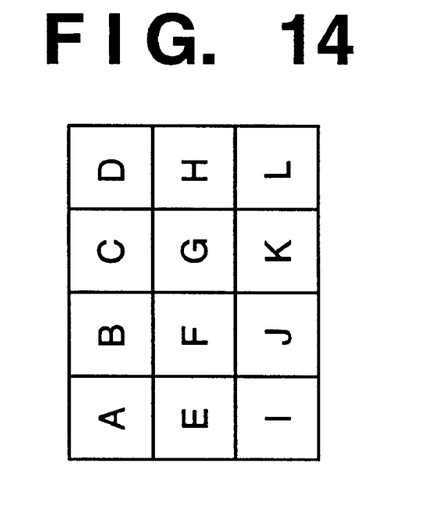
FIGS. 14 and 15 are diagrams explaining a rotation method of rotating an image divided into blocks for 90 degrees counterclockwise.
Figure 15:
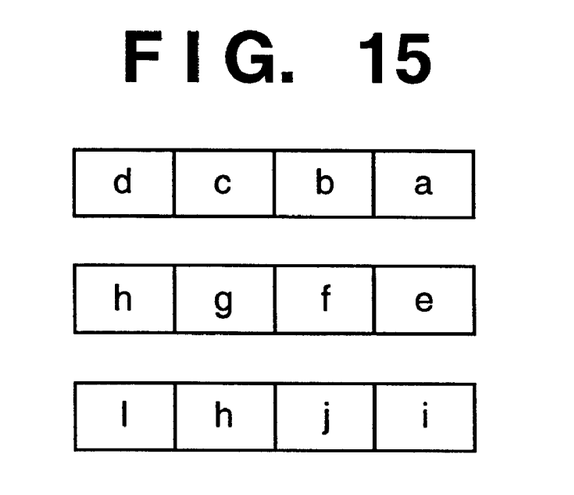

FIGS. 14 and 15 are diagrams for explaining a rotation method of rotating an image divided into blocks in 90 degrees counterclockwise. As shown in FIGS. 14 and 15, the encoding sequence for the rotation in 90 degrees counterclockwise is D→C→B→A, and the decoding sequence is (D, H, L)→(C, G, K)→(B, F, J)→(A, E, I).

Note that the same method as shown in FIG. 11 can be used for an address control for the encoding in this case.

Further, the address calculation method of block codes according to the first embodiment can be applied to compressed data of a color image.

As a method of encoding a color image in a block unit, there is, for instance, an Internationally Standardized method, JPEG, which is based on the DCT (discrete cosine transformation). However, since the method according to JPEG utilizes a difference between a previous block and a block of interest for encoding a direct current component and each block is not independent from other blocks, the method cannot be used as is.

Hereinafter, an encoding process of a color image will be briefly described.

Figure 16A:
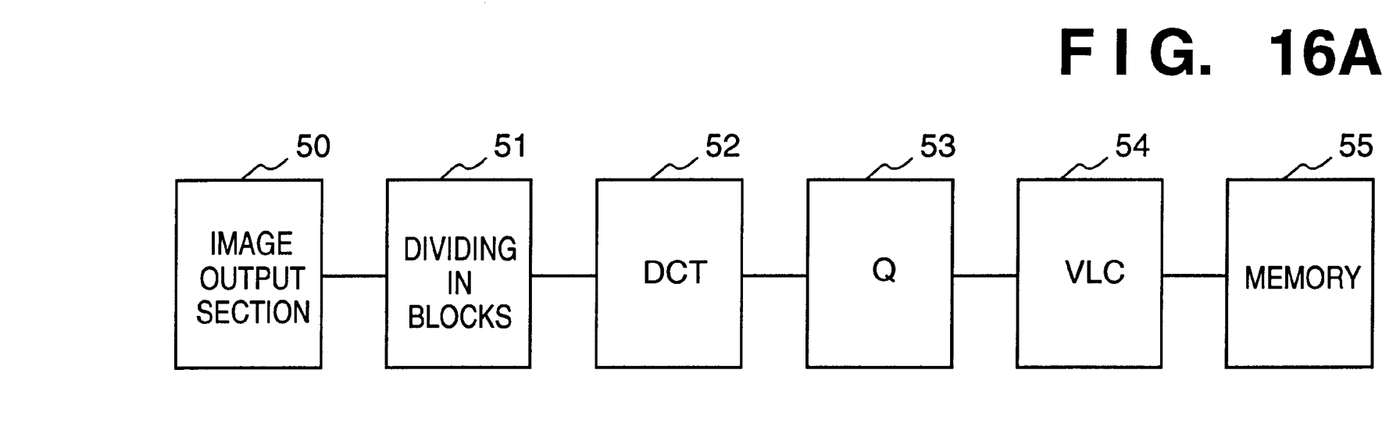
FIGS. 16A and 16B are block diagrams showing an example of a process according to the DCT encoding method.
Figure 16B:
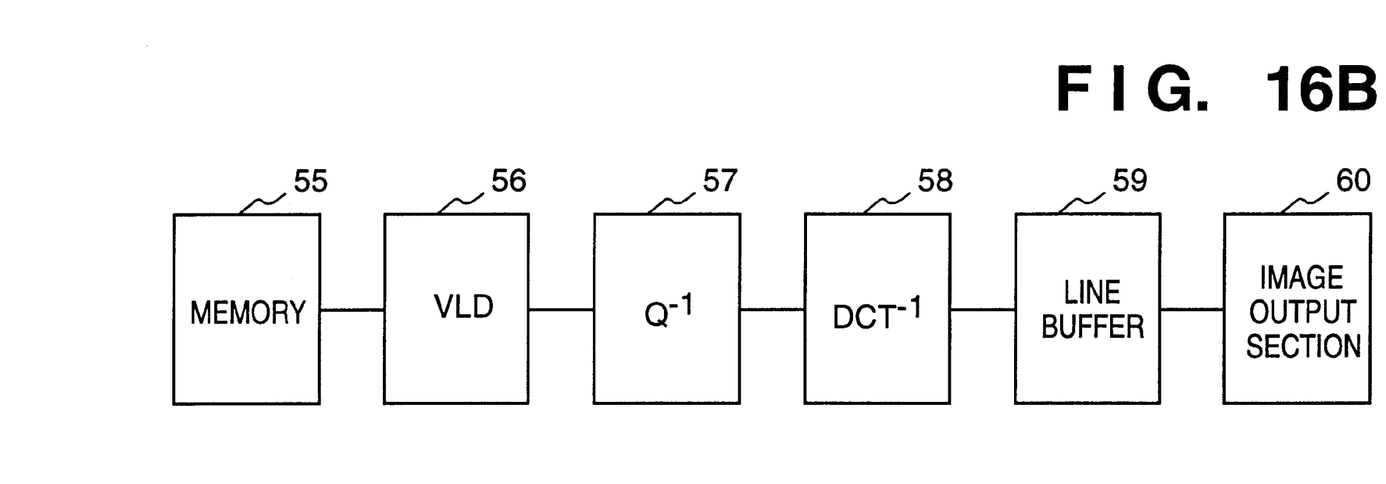

FIGS. 16A and 16B show an example of a process according to the DCT encoding method. In these figures, reference numeral 50 denotes an image input section; 51, a block dividing section; 52, a DCT transformation section; 53, a quantization section; 54, a variable-length encoder; 55, a memory; 56, a variable-length decoder; 57, an inverse-quantization section; 58, an inverse-DCT transformation section; 59, a line buffer; and 60, an image output section.

In the processing as shown in FIGS. 16A and 16B, for the purpose of obtaining block codes which are independent from other block codes, the direct-current component according to the DCT is quantized without being encoded. However, for the process other than quantizing the direct-current component, a method same as the aforementioned JPEG method is applied.

To form a rotated image, an inverse-DCT transformation may be used by making a transposed matrix of DCT coefficients. Alternatively, when a result of the inverse-DCT transformation is stored in a line buffer, an address may be controlled to generate a rotated image. It should also be noticed that block codes utilizing vector quantization can be used.

As set forth above, the sum of the block code length for each of the block line units is calculated in the encoder, while a head address of the block which constitutes a rotated image is generated in the decoder based on the sum of the code length. By virtue of this construction, rotation process of an image can be easily performed when utilizing encoded data.

<Second Embodiment>

Next, the second embodiment of the present invention will be described.

Figure 17:
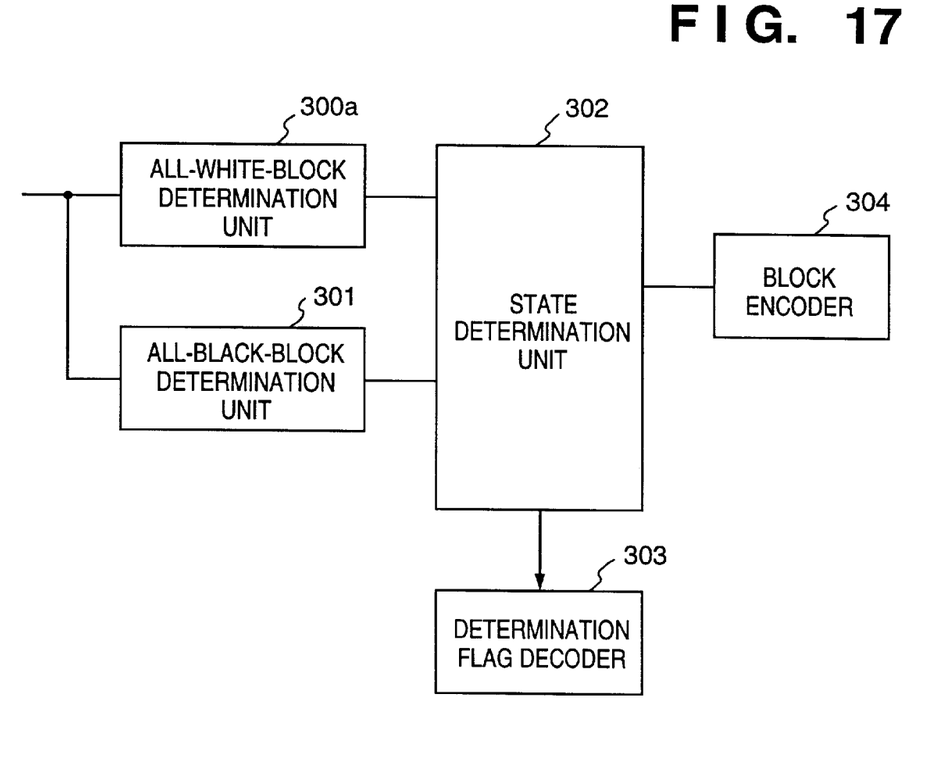
FIG. 17 is a block diagram showing a structure of an encoder for encoding block flag data, having a detecting circuit for detecting all-white blocks and all-black blocks according to a second embodiment.
Figure 18:
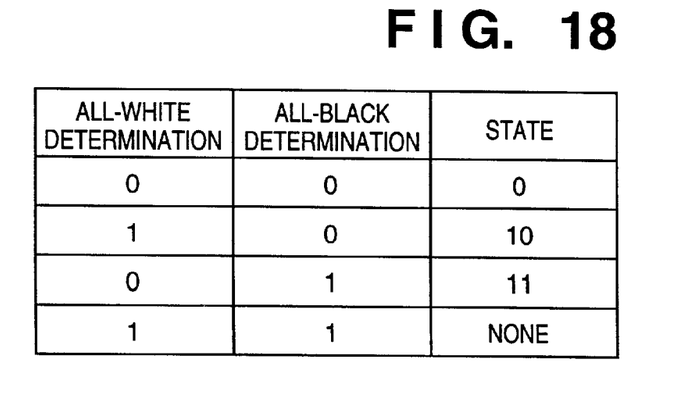
FIG. 18 is a truth table in a state determination unit.

FIG. 17 is a block diagram showing a structure of an encoder for encoding block flag data, having a detecting circuit for detecting blocks indicative of all-black pixels in addition to the circuit for detecting blocks indicative of all-white pixels, according to the present embodiment. Hereinafter, blocks indicative of all-black pixels are referred to as all-black blocks, and blocks indicative of all-white pixels are referred to as all-white blocks. In FIG. 17, reference numeral 300a denotes an all-white block determination unit; 301, an all-black block determination unit; and 302, a state determination unit for determining a state of a block, which outputs signals indicating an all-white state (0), an all-black state (10), and other states (11), as shown in FIG. 18.

Figure 19:
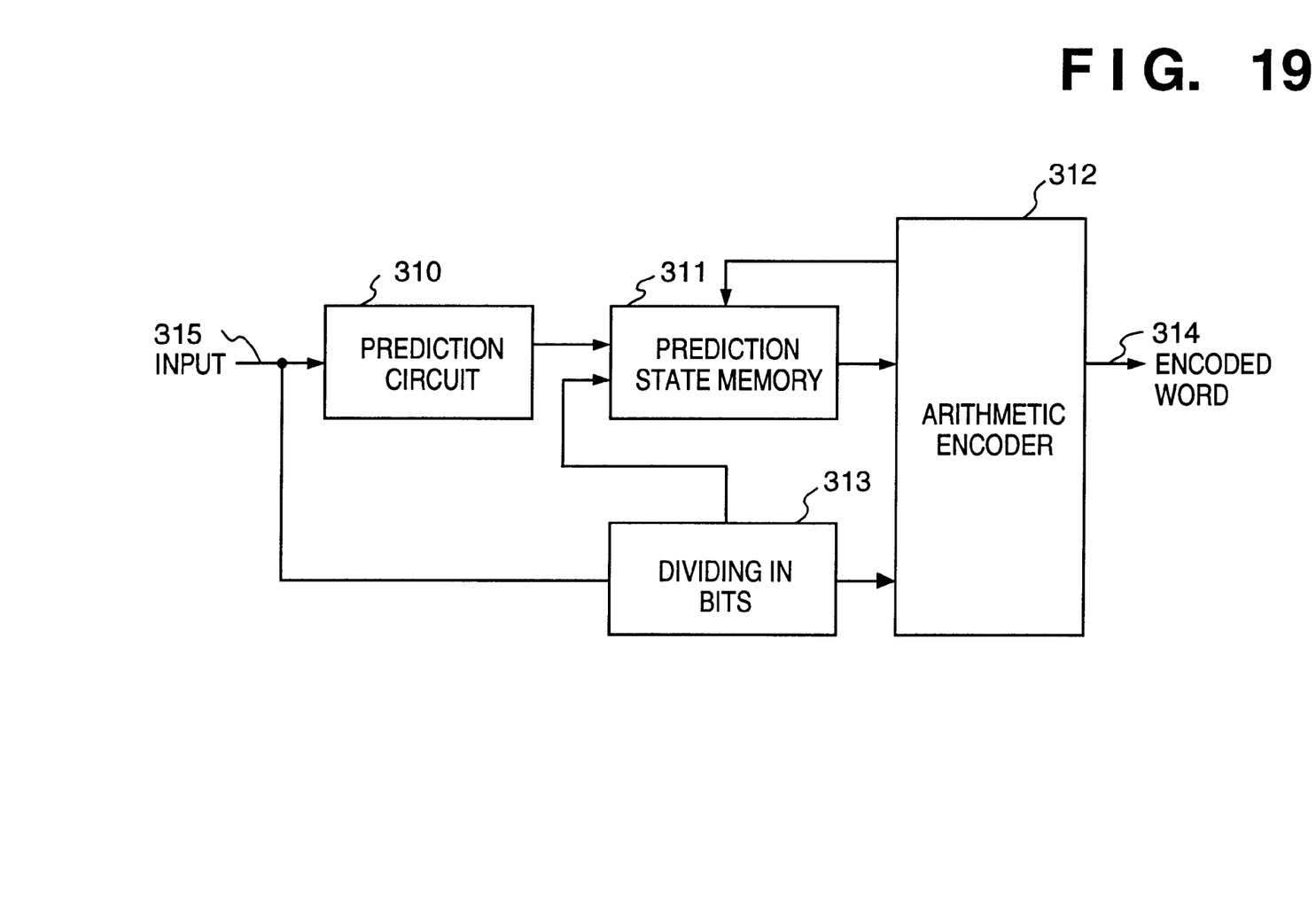
FIG. 19 is a block diagram showing an example of an encoder according to the second embodiment.

FIG. 19 is a block diagram showing a structure of a prediction encoder according to the second embodiment. In a prediction circuit 310, a state of prediction is generated in accordance with states of surrounding pixels. The state of prediction, which is a signal indicating the current block bit position data, is inputted as an address of a prediction state memory 311, and an arithmetic parameter is read out from the memory. The parameter is then inputted in an arithmetic encoder 312, and data in the block is encoded bit by bit.

As for a decoding process, a decoded value is determined bit by bit, by using a circuit in which data is reversely processed compared with the above circuit. When the first bit of the decoded value is (0), the block is all-white; and when the first bit of the decoded value is (1) and the second bit is (0), the block is all-black. When the first and second bits of the decoded value are (1), an encoded block and a state of the block flag can be determined.

To employ the above described configuration to a facsimile apparatus, processing is performed in the following steps.

An original image on a sheet of A4 size which is fed lengthwisely is read at a sender's side, and at a receiver's side, the image data received in the above-mentioned size is converted in a block-line unit from transmission codes to storage codes corresponding to rotation. When the conversion process is completed for an entire page, decoding is performed by controlling of the addressing codes such that the image is rotated in 90 degrees to be widthwise corresponding to an A4 size.

By virtue of the above process, it is possible to output image data widthwisely on a recording sheet of A4 size, without reducing the image data 70% or without utilizing a page memory. Even a receiving apparatus having a page memory can receive plural pages of image with a same capacity of memory, by utilizing the memory as a compressing memory.

Conventionally, in the case where plural pages of image data is received utilizing a memory to its full capacity, if an image rotated in 90 degrees by using a page memory, is to be compressed again, a run length of white pixels or black pixels varies so that it changes code lengths, thereby causing a problem that the plural pages of image data cannot be stored in the same memory.

However, the above described configuration according to the embodiments of the present invention, can also be applied to data reception in the foregoing case without causing any problems.

The present invention also enables an image input apparatus which feeds a recording sheet of A4 size widthwisely, to generate rotation codes so that the codes are rotated in a block unit at the time of transmission, thus converting the codes into communication codes for communication of those codes in a lengthwise direction corresponding to an A4 size. A receiver can then receive and record the codes using a regular facsimile apparatus.

Since an image inputting processing in a widthwise direction corresponding to an A4 size sheet requires less scanning time than one in a lengthwise direction, the apparatus provides an advantage in inputting speed.

As set forth above, at the encoder side, colors of pixels in a predetermined block are determined, and only those blocks having pixels indicative of different colors are independently encoded block by block. At the decoder side, an address of block data for sequentially forming a rotated image is controlled to decode pixels in the block, for rotating the pixels in the block. This construction realizes rotation operation of an image utilizing encoded data, without using a memory with a large capacity.

The present invention can be applied to a system constituted by a plurality of devices, or to an apparatus comprising a single device.

The present invention is not limited to the above embodiments and various changes and modifications can be made within the spirit and scope of the present invention. Therefore, to appraise the public of the scope of the present invention, the following claims are made.

What is claimed is:

1. An image processing apparatus, having an encoder for encoding an image and a decoder for decoding an encoded image, for performing a rotation process on an image, wherein said encoder comprises:
dividing means for dividing an image into a plurality of blocks of image data, each block having N×N pixels;
encoding means for encoding the image data in each of the plurality of blocks to obtain code data representative of the image data therein;
calculation means for calculating a sum of code lengths of the code data for each of the blocks included in each of a plurality of stripes, each stripe consisting of N lines of the image; and
storing means for storing the code data for the plurality of stripes and the respective sum, and wherein said decoder comprises:
generating means for generating, for each one stripe, an address for each of the blocks in the one stripe to be sequentially processed in accordance with a predetermined sequence corresponding to the rotation process, based on the stored sum;
reading means for reading out the stored code data for each of the plurality of blocks in the one stripe in accordance with the respective address;
decoding means for decoding the read-out code data to obtain N×N pixels in each of the plurality of blocks; and
process means for performing the rotation process on the N×N pixels obtained by said decoding means in each of the plurality of blocks to provide a rotated image.

2. The image processing apparatus according to claim 1, wherein said generating means comprises:
counter means, in which the stored sum for the one stripe is set as initial value, for providing a counted value;
adding means for adding a code length of the code data decoded by said decoding means to the counter value of said counter means; and
updating means for updating the counter value of said counter means in accordance with said adding means.

3. The image processing apparatus according to claim 2, wherein said generating means generates the address of each of the plurality of blocks based on the counter value of said counter means.

4. The image processing apparatus according to claim 1, wherein the rotated image is encoded for transmission and transmitted to a receiving side.

5. The image processing apparatus according to claim 1, wherein the image to be divided is a black and white binary image, and wherein the code data is obtained by applying a prediction encoding method to the binary image.

6. The image processing method according to claim 1, wherein the image to be divided is a color image, and wherein the code data is obtained by applying a discrete cosine transformation method to the color image.

7. The image processing apparatus according to claim 1, wherein the image to be divided is a color image, and wherein the code data is obtained by applying a discrete cosine transformation method to the color image.

8. An image processing apparatus having an encoder for encoding an image and a decoder for decoding an encoded image, for performing a rotation process on an image, wherein said encoder comprises:
dividing means for dividing an image into a plurality of blocks of image data, each block having N×N pixels;
determination means for determining, for each block, whether the pixels therein indicate a same color;
first encoding means for encoding determination results obtained by said determination means to obtain first code data representative of the determination results;
second encoding means for encoding the image data in each of the plurality of blocks to obtain second code data representative of the respective image data in accordance with the determination results obtained by said determination means; and
storing means for storing the first code data and the second code data, and wherein said decoder comprises:
first decoding means for decoding the stored first code data to obtain determination data representative of whether the pixels in the respective block indicate the same color;
generating means for generating an address of each of the blocks to be sequentially processed in accordance with a predetermined sequence corresponding to the rotation process, based on the determination data obtained by said first decoding means;
reading means for reading out the stored second code data in accordance with the address of the respective block;
second decoding means for decoding the read-out second code data to obtain N×N pixels in each of the blocks; and
process means for performing the rotation process on the N×N pixels in each of the blocks.

9. The image processing apparatus according to claim 8, wherein said determination means determines whether all of the pixels in each block indicate a white color.

10. The image processing apparatus according to claim 8, wherein said determination means determines whether all the pixels in each block indicate one of a white color and a black color.

11. The image processing apparatus according to claim 8, wherein said second encoding means encodes the image data for blocks consisting of pixels having different colors in the plurality of blocks.

12. The image processing apparatus according to claim 11, wherein said second encoding means does not encode the image data for blocks in which all the pixels are determined to be white by said determination means.

13. The image processing apparatus according to claim 11, wherein said process means does not perform the rotation processes on the pixels in blocks in which all the pixels are determined to be white by said determination means.

14. The image processing apparatus according to claim 8, wherein the first code data is obtained by applying a run-length encoding method to the determination results.

15. The image processing apparatus according to claim 8, wherein the image to be divided is a black and white binary image, and wherein the second code data is obtained by applying a prediction encoding method to the binary image.

16. The image processing apparatus according to claim 8, wherein the image to be divided is a color image, and wherein the code data is obtained by applying a discrete cosine transformation method to the color image.

17. An image processing method for performing a rotation process on an image, comprising:

a dividing step of dividing an image into a plurality of blocks of image data, each block having N×N pixels;

an encoding step encoding the image data in each of the plurality of blocks to obtain code data representative of the image data therein;

a calculation step of calculating a sum of code lengths of the code data for each of the blocks included in each of a plurality of stripes, each stripe consisting of N lines of the image;

a storing step of storing the code data for the plurality of stripes and the respective sum;

a generating step of generating, for each one stripe, an address for each of the blocks in the one stripe to be sequentially processed in accordance with a predetermined sequence corresponding to the rotation process, based on the stored sum;

a reading step of reading out the stored code data for each of the plurality of blocks in the one stripe in accordance with the respective address;

a decoding step of decoding the read-out code data to obtain N×N pixels in each of the plurality of blocks; and a process step of performing the rotation process on the N×N pixels obtained by said decoding step in each of the plurality of blocks to provide a rotated image.

18. The image processing method according to claim 17, wherein said generating step comprises:

a counter step, in which the stored sum for the one stripe is set as initial value, for providing a counted value;

an adding step of adding a code length of the code data decoded by said decoding step to the counter value of said counter step; and an updating step of updating the counter value of said counter step in accordance with said adding step.

19. The image processing method according to claim 18, wherein said generating step generates the address of each of the plurality of blocks based on the counter value of said counter step.

20. The image processing method according to claim 17, wherein the rotated image is encoded for transmission and transmitted to a receiving side.

21. The image processing method according to claim 17, wherein the image to be divided is a black and white binary image, and wherein the code data is obtained by applying a prediction encoding method to the binary image.

22. An image processing method for performing a rotation process on an image, comprising:

a dividing step of dividing an image into a plurality of blocks of image data, each block having N×N pixels;

a determination step of determining, for each block, whether the pixels therein indicate a same color;

a first encoding step of encoding determination results obtained by said determination step to obtain first code data representative of the determination results;

a second encoding step of encoding the image data in each of the plurality of blocks to obtain second code data representative of the respective image data in accordance with the determination results obtained by said determination step;

a storing step of storing the first code data and the second code data;

a first decoding step of decoding the stored first code data to obtain determination data representative of whether the pixels in the respective block indicate the same color;

a generating step of generating an address of each of the blocks to be sequentially processed in accordance with a predetermined sequence corresponding to the rotation process, based on the determination data obtained by said first decoding step;

a reading step of reading out the stored second code data in accordance with the address of the respective block;

a second decoding step of decoding the read-out second code data to obtain N×N pixels in each of the blocks; and a process step of performing the rotation process on the N×N pixels in each of the blocks.

23. The image processing method according to claim 22, wherein said determination step determines whether all of the pixels in each block indicate a white color.

24. The image processing method according to claim 22, wherein said determination step determines whether all the pixels in each block indicate one of a white color and a black color.

25. The image processing method according to claim 22, wherein said second encoding step encodes the image data for blocks consisting of pixels having different colors in the plurality of blocks.

26. The image processing method according to claim 22, wherein said second encoding step does not encode the image data for blocks in which all the pixels are determined to be white by said determination step.

27. The image processing method according to claim 22, wherein said process step does not perform the rotation processes on the pixels in blocks in which all the pixels are determined to be white by said determination step.

28. The image processing method according to claim 22, wherein the first code data is obtained by applying a run-length encoding method to the determination results.

29. The image processing method according to claim 22, wherein the image to be divided is a black and white binary image, and wherein the second code data is obtained by applying a prediction encoding method to the binary image.

30. The image processing method according to claim 22, wherein the image to be divided is a color image, and wherein the code data is obtained by applying a discrete cosine transformation method to the color image.

* * * * *

UNITED STATES PATENT AND TRADEMARK OFFICE
CERTIFICATE OF CORRECTION

PATENT NO.   : 5,991,450
DATED        : November 23, 1999
INVENTOR(S)  : HIDEFUMI OHSAWA ET AL.

It is certified that error appears in the above-identified patent and that said Letters Patent is hereby corrected as shown below:

COLUMN 6:

Line 35, "an example;" should read --examples;--; and
    Line 66, "1 to 10" should read --①  to ⑩--.

COLUMN 7:

Line 1, "1 to 10" should read --①  to ⑩--.

COLUMN 8:

Line 49, "above described" should read
        --above-described--.

COLUMN 9:

Line 7, "above described" should read
        --above-described--.

COLUMN 10:

Line 19, "claim 1" should read --claim 17--.

Signed and Sealed this

Tenth Day of April, 2001

NICHOLAS P. GODICI

*Attest:*

*Attesting Officer*   Acting Director of the United States Patent and Trademark Office